United States Patent
Kozu et al.

(10) Patent No.: US 6,447,367 B1
(45) Date of Patent: Sep. 10, 2002

(54) PROCESSING JIG

(75) Inventors: Masaki Kozu; Masahiro Sasaki, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/708,536

(22) Filed: Nov. 9, 2000

(30) Foreign Application Priority Data

Dec. 21, 1999 (JP) .............................................. 11-362188

(51) Int. Cl.⁷ .............................................. B24B 49/00
(52) U.S. Cl. .............................. 451/5; 451/11; 451/55; 451/383; 451/405; 29/603.6
(58) Field of Search .............................. 451/5, 11, 405, 451/55, 387, 390; 29/603.16

(56) References Cited

U.S. PATENT DOCUMENTS

| | | | |
|---|---|---|---|
| 4,517,041 A | * | 5/1985 | Hennenfent la. .......... 451/53 |
| 4,914,868 A | | 4/1990 | Church et al. |
| 5,117,589 A | * | 6/1992 | Bischoff et al. ............ 451/387 |
| 5,203,119 A | * | 4/1993 | Cole .......................... 451/387 |
| 5,607,340 A | | 3/1997 | Lackey et al. |
| 5,620,356 A | | 4/1997 | Lackey et al. |
| 5,624,298 A | * | 4/1997 | Yumoto et al. ................ 451/28 |
| 6,045,431 A | * | 4/2000 | Cheprasov et al. ............ 451/6 |
| 6,050,878 A | * | 4/2000 | Kanzo et al. .................... 451/5 |
| 6,095,895 A | * | 8/2000 | Fujita et al. .................... 451/5 |
| 6,174,218 B1 | * | 1/2001 | Church et al. ................. 451/5 |
| 6,315,633 B1 | * | 11/2001 | Kozu et al. ..................... 451/5 |

FOREIGN PATENT DOCUMENTS

JP       2-95572       4/1990

* cited by examiner

Primary Examiner—George Nguyen
(74) Attorney, Agent, or Firm—Oliff & Berridge, PLC

(57) ABSTRACT

A processing jig comprises: a main body to be fixed to a processing apparatus; a retainer that is long in one direction for retaining a bar as an object long in one direction; four couplers for coupling the retainer to the main body; three load application sections, coupled to the retainer, to each of which a load is applied for deforming the retainer; and three arms for coupling the load application sections to the retainer. The retainer has a beam structure that is bent with an application of external force. A bar fixing section to which the bar is fixed is provided at a lower end of the retainer. Both ends of the retainer are not coupled to the main body but left open.

6 Claims, 15 Drawing Sheets

PROCESSING JIG

BACKGROUND OF THE INVENTION

1. Field of the Invention

The present invention relates to a processing jig for holding an object processed by a processing apparatus.

2. Description of the Related Art

A flying-type thin-film magnetic head used for a magnetic disk device and so on is generally made up of a slider and a magnetic head element provided at the trailing edge of the slider. The slider generally comprises a rail whose surface functions as a medium facing surface (an air bearing surface) and a tapered section or a step near the end on the air inflow side. The rail flies slightly above the surface of a recording medium such as a magnetic disk by means of air flow from the tapered section or step.

A thin-film magnetic head element generally used is a composite-type element made up of layers of an induction-type electromagnetic transducer for writing and a magnetoresistive (MR) element for reading.

In general, such thin-film magnetic heads are formed through cutting a wafer in one direction in which sections to be sliders (hereinafter called slider sections) each including a thin-film magnetic head element are aligned in a plurality of rows. A bar-like magnetic head material (hereinafter called a bar) made up of a row of slider sections is thereby formed. Processing such as lapping is performed on a surface of the bar to be the medium facing surface (hereinafter called the medium facing surface for convenience). The bar is then separated into individual sliders.

In general, in order to stabilize the output characteristic of a thin-film magnetic head, it is important to maintain the distance between the magnetic pole of the head and the surface of a recording medium at an extremely small specific value. It is therefore required in magnetic head processing that the flatness of the medium facing surface of the head precisely fall on a specific value so as to stabilize a flying amount and that the throat height and the MR height of the head fall within a specific range. The throat height is the length (height) of the magnetic pole of an induction-type electromagnetic transducer between an end thereof located in the medium facing surface and the other end. The MR height is the length (height) between an end of the MR element located in the medium facing surface and the other end.

There are several methods for lapping the medium facing surface so as to achieve desired values of the throat height and MR height of a thin-film magnetic head. A method generally used and achieving high precision is the method that utilizes a processing jig having functions described later and a lapping apparatus having the function of automatically lapping while applying an appropriate load to the jig and deforming the bar bonded to the jig.

The processing jig used in this method comprises a main body fixed to the lapping apparatus, a retainer that is long in one direction for retaining a bar, and a plurality of load application sections, coupled to the retainer, to each of which a load is applied for deforming the retainer. The shape of the retainer is a narrow and long beam that is bent with an application of external force. An external force being applied to the load application sections of the jig, the retainer is bent. The bending of the retainer causes bending of the bar held by the retainer.

A method of lapping a bar using the jig will now be described. In this method, the bar is fixed to the retainer of the jig with an adhesive and the like so that the surface of the bar to be lapped faces outside.

Next, the values of the throat height and MR height of each magnetic head element in the bar fixed to the jig are determined through an optical or electrical method. The deviation of the determined values from the target values, that is, the amounts of lapping required, are calculated.

Of the sections to be lapped corresponding to the magnetic head elements in the bar, a section that requires a greater amount of lapping than the other sections needs to be more lapped. Therefore, the bar is deformed by applying a load to the load application sections so that the surface to be lapped of the section is made convex. On the other hand, a section that requires a smaller amount of lapping than the other sections needs to be less lapped. Therefore, the bar is deformed by applying a load to the load application sections so that the surface to be lapped of the section is made concave. The bar is lapped by pressing the medium facing surface of the bar against a rotating lapping plate while the bar is deformed.

In such a manner, a series of operations is automatically repeated, including determining the throat height and the MR height of each magnetic head element, calculating the deviation of the determined values from the target values, that is, the amounts of lapping required, and lapping the bar while deforming the bar in accordance with the amounts of lapping required. Variations in the throat heights and the MR heights of the magnetic head elements are thereby modified. Finally, the throat heights and the MR heights of the magnetic head elements fall within a specific range.

A lapping apparatus for performing lapping of a bar as described above is disclosed in U.S. Pat. No. 5,620,356. A jig for lapping magnetic heads is disclosed in U.S. Pat. No. 5,607,340. A lapping control apparatus is disclosed in Published Unexamined Japanese Patent Application Heisei 2-95572 (1990) for controlling the throat height through observing a resistance of an MR element.

In prior art a bar of a specific length is separated from a wafer, and processing such as lapping is performed on the bar through the use of a processing jig as the one described above.

It is preferred to utilize a bar as long as possible in order to increase the processing efficiency, that is, to maximize the number of products obtained through processing at a time. Therefore, it is required to change the length of the bar in some cases. It is possible in such a case to change the length and height of the processing jig in accordance with the bar length.

However, the processing jig is used in a plurality of steps in addition to lapping. In each of these steps the jig is aligned and fixed when used. Therefore, if the length or the height of the jig is changed, it is required to change all of the portions used for alignment and fixing of the jig in each of the steps. In addition, if some types of processing jigs having different length or height are used, it is required to design the portions used for alignment and fixing of the jig such that these portions conform to the different types of jigs in each of the steps. Taking these factors into account, it is desirable that the shapes of the jigs are the same, regardless of the bar length.

However, in the prior-art processing jig as the one disclosed in U.S. Pat. No. 5,607,340 mentioned above, the ends of the retainer are coupled to the main body. In the jig having such a structure, flexible deformation of the neighborhoods of the ends of the retainer is suppressed. Therefore, it is difficult to deform the neighborhoods of the ends of the retainer, in particular, of the prior-art jig into a desired shape. Consequently, the prior-art jig has a problem that, if the bar length is long, the deviations from the target values of the throat height and the MR height of each of thin-film magnetic head elements increase, the elements being located near the ends of the bar.

OBJECT AND SUMMARY OF THE INVENTION

It is an object of the invention to provide a jig having a retainer for retaining an object to be processed that is long in one direction, the jig deforming the object by deforming the retainer, the jig being capable of deforming the retainer including portions near ends thereof into a desired shape and processing the object with accuracy even if the object is long.

A processing jig of the invention retains an object to be processed that is long in one direction. The jig is fixed to a processing apparatus for processing the object. The jig comprises: a main body to be fixed to the processing apparatus; a retainer that is long in one direction for retaining the object; a plurality of couplers for coupling the retainer and the main body to each other; and a plurality of load application sections to each of which a load is applied for deforming the retainer, the load application sections being coupled to the retainer. Both ends of the retainer are not coupled to the main body but left open.

According to the jig of the invention, since the ends of the retainer are not coupled to the main body but left open, it is possible to deform the retainer including portions near the ends thereof into a desired shape.

According to the processing jig of the invention, each of two of the load application sections may be located closer to each of the ends of the retainer than a middle of the length of the retainer, and coupled to a position closer to the middle by a specific distance from each of the ends of the retainer. In addition, each of two of the couplers may have an end connected to the main body and the other end connected to a portion coupling each of the two of the load application sections to the retainer. In this case, each of the two of the couplers may be plate-shaped and flexible.

According to the processing jig of the invention, the object may be a bar-like magnetic head material made up of a row of sections to be sliders each of which includes a thin-film magnetic head element.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

[First Embodiment]

Figure 3:
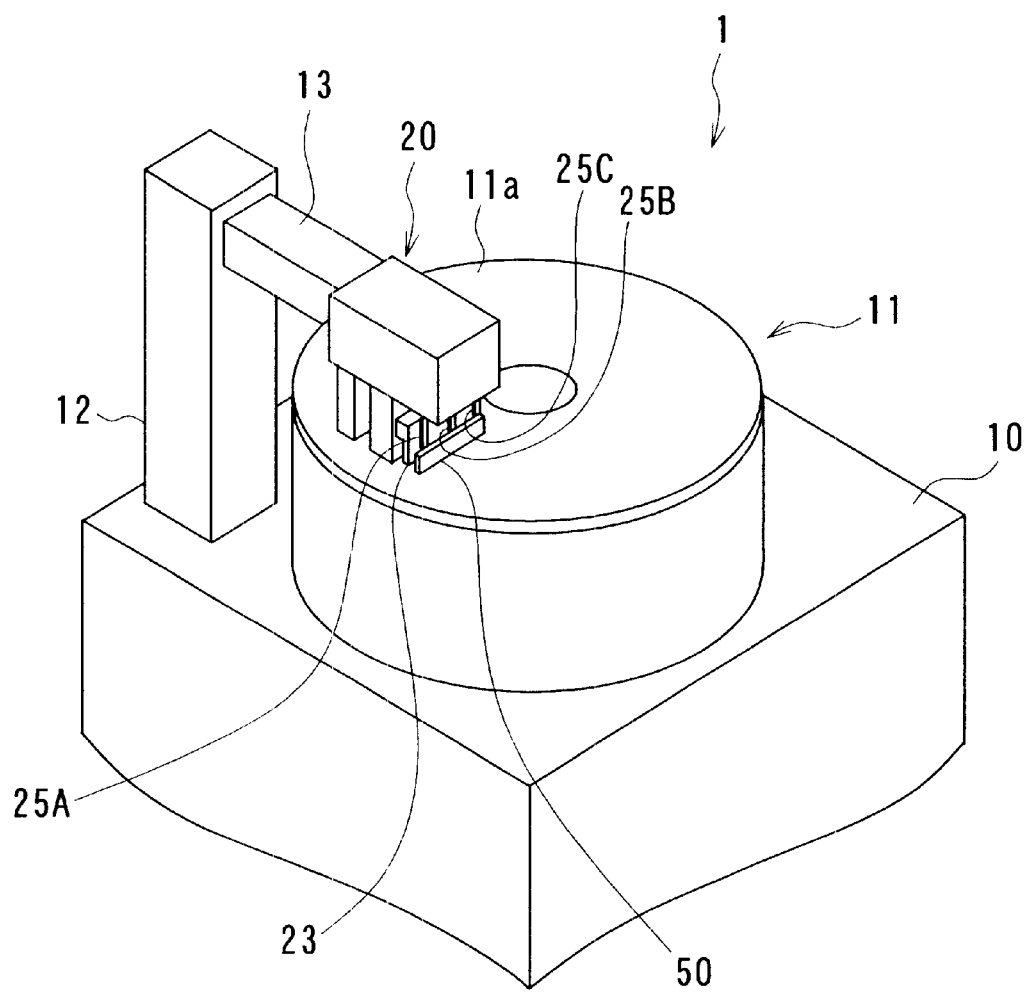
FIG. 3 is a perspective view of an example of a processing apparatus wherein the jig of the first embodiment is used.

Reference is now made to FIG. 3 to describe an example of a processing apparatus wherein a processing jig of a first embodiment of the invention is used. FIG. 3 is a schematic perspective view of the processing apparatus. The processing apparatus 1 is an apparatus for lapping a bar that is a magnetic head material in the shape of a bar in which sections to be sliders are arranged in a row. The processing apparatus 1 comprises: a table 10; a rotating lapping table 11 provided on the table 10; a strut 12 provided on the table 10 by the side of the rotating lapping table 11; and a material supporter 20 attached to the strut 12 through an arm 13. The rotating lapping table 11 has a lapping plate 11a to come to contact with the bar.

The material supporter 20 comprises a jig retainer 23 and three load application rods 25A, 25B and 25C placed in front of the jig retainer 23 with specific spacing. A processing jig (simply called 'jig' in the following description) 50 of this embodiment is to be fixed to the jig retainer 23. As will be described later in detail, the jig 50 has three load application sections each of which is in the shape of a hole having a rectangular cross section. Load application pins are provided at the lower ends of the load application rods 25A, 25B and 25C, respectively. Each of the load application pins has a head to be inserted to each of the load application sections (holes), the head having a rectangular cross section. Each of the load application pins is driven by an actuator not shown in the vertical, horizontal (the length of the jig 50) and rotational directions.

Figure 1A:
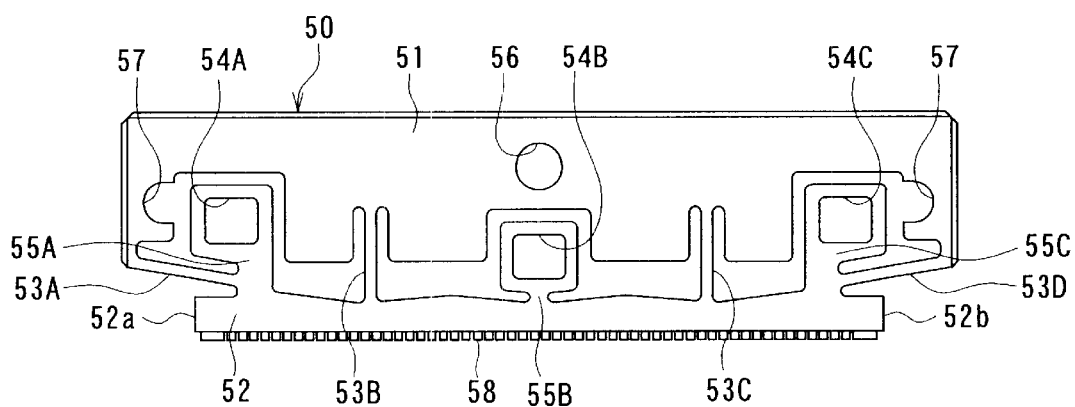
FIG. 1A, FIG. 1B, FIG. 1C and FIG. 1D illustrate a jig of a first embodiment of the invention.
Figure 1B:
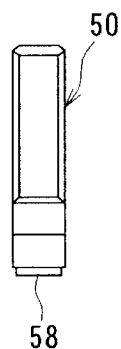
Figure 1C:
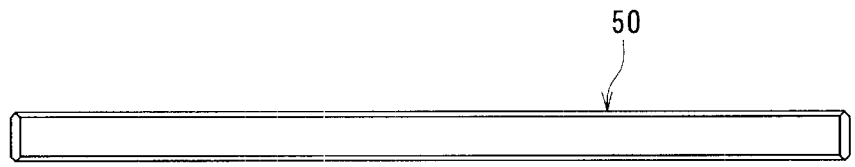
Figure 1D:
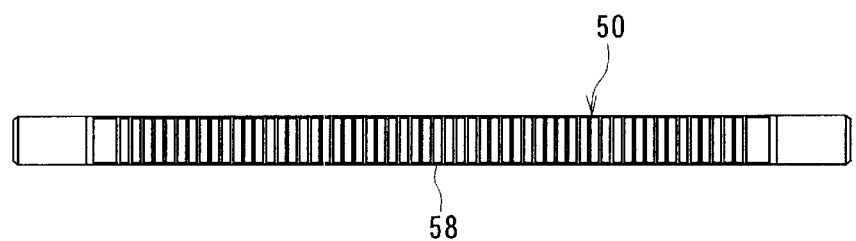

Referring to FIG. 1A, FIG. 1B, FIG. 1C and FIG. 1D, the structure of the jig of this embodiment will now be described. FIG. 1A to FIG. 1D illustrate the jig. FIG. 1A is a front view of the jig. FIG. 1B is a right side view of the jig. FIG. 1C is a top view of the jig. FIG. 1D is a bottom view of the jig. As shown, the jig 50 of the embodiment comprises: a main body 51 to be fixed to the processing apparatus 1 shown in FIG. 3, for example; a retainer 52 that is long in one direction for retaining a bar that is an object long in one direction to be processed; four couplers 53A to 53D for coupling the retainer 52 to the main body 51; three load application sections 54A to 54C, coupled to the retainer 52, to which a load is applied for deforming the retainer 52; and arms 55A to 55C for coupling the retainer 52 to the load application sections 54A to 54C.

The main body 51 has a hole 56 for fixing located in the middle of the length of the main body 51 and in a position above the middle of the vertical height of the main body 51. A bolt is inserted to the hole 56 for fixing the main body 51 to the jig fixing pin (not shown) provided in the jig retainer 23 of the processing apparatus 1. The jig 50 is fixed to the processing apparatus 1 at the only one point, that is, the point of the hole 56.

The main body 51 further has two engaging sections 57 in which the two guide pins provided in the jig retainer 23 of the processing apparatus 1 are engaged. The engaging sections 57 are provided to prevent the jig 50 from rotating around the hole 56.

The shape of the retainer 52 is a narrow and long beam that is bent with an application of external force. At the lower end of the retainer 52, a bar fixing section 58 is provided to which a bar is fixed. The bar fixing section 58 has a plurality of grooves where a blade for cutting a bar enters. Ends 52a and 52b of the retainer 52 are not coupled to the main body 51 but left open.

The jig 50 may be made of stainless steel or a ceramic such as zirconia ($ZrO_2$) or alumina ($Al_2O_3$).

In the embodiment, the two load application sections 54A and 54C are each placed closer to each of the ends 52a and 52b than the middle of the length of the retainer 52, and nearly in the middle of the vertical height of the retainer 52. Each of the load application sections 54A and 54C is coupled through each of the arms 55A and 55C at the point closer to the middle by a specific distance from each of the ends 52a and 52b of the retainer 52. The other load application section 54B is placed in the middle of the length of the main body 51 and in a position below the middle of the vertical height of the main body 51.

Each of the two couplers 53A and 53D has an end connected to the main body 51, and the other end connected to each of the arms 55A and 55C which is the portion for coupling each of the load application sections 54A and 54C to the retainer 52. Each of the couplers 53A and 53D is plate-shaped and flexible.

Each of the other two couplers 53B and 53C has an end connected to the main body 51, and the other end connected to the retainer 52. Each of the couplers 53B and 53C is plate-shaped and flexible.

Figure 2:
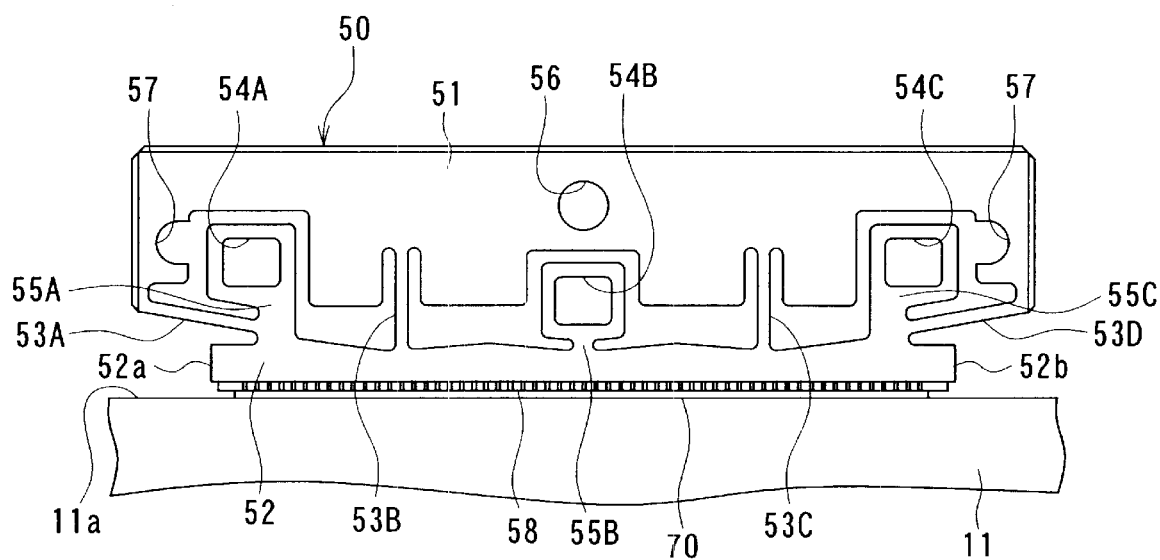
FIG. 2 is a front view of the jig of the first embodiment in use.

Reference is now made to FIG. 2 to describe the function of the jig 50. FIG. 2 is a front view of the jig 50 in use. As shown, a bar 70 is fixed to the bar fixing section 58 of the jig 50 through bonding, for example, so that the medium facing surface of the bar 70 faces outside (faces downward). The jig 50 retaining the bar 70 is fixed to the processing apparatus 1 and placed such that the surface of the bar 70 to be processed comes to contact with the lapping plate 11a of the rotating lapping table 11. In this state, the load application pins of the processing apparatus 1 are driven in three directions including vertical, horizontal and rotational directions. Loads in the three directions are thereby applied to each of the load application sections 54A, 54B and 54C of the jig 50.

As thus described, the retainer 52, the bar fixing section 58 and the bar 70 are deformed by applying loads in various directions to the load application sections 54A, 54B and 54C of the jig 50. It is thereby possible to lap the medium facing surface of the bar 70 while the throat heights and MR heights of the thin-film magnetic head elements in the bar 70 are controlled so that the target values are obtained.

According to the jig 50 of this embodiment, the ends 52a and 52b of the retainer 52 are not coupled to the main body 51 but left open. As a result, free deformation of portions near the ends 52a and 52b of the retainer 52 will not be prevented, and it is possible to obtain a flection similar to a cantilevered structure. Therefore, the jig 50 allows the retainer 52 including the portions near the ends 52a and 52b to be deformed into a desired shape. As a result, it is possible to process the bar 70 with accuracy even if the bar 70 is long and to reduce deviations from the target values of the throat height and the MR height of each of many of thin-film magnetic head elements included in the long bar 70.

According to the jig 50 of this embodiment, each of the load application sections 54A, 54B and 54C is capable of receiving loads in the three directions. It is thereby possible to deform the retainer 52 into a complicated shape and to control the throat heights and the MR heights of thin-film magnetic head elements with high accuracy.

The bar 70 is formed through cutting a wafer in one direction, the wafer including a plurality of rows of slider sections each of which includes a thin-film magnetic head element. The bar 70 is made up of a row of slider sections.

Figure 4:
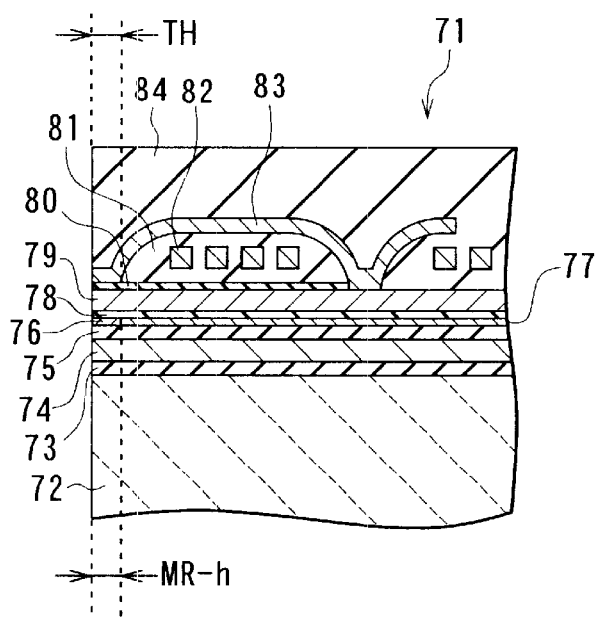
FIG. 4 is a cross-sectional view illustrating an example of the configuration of a thin-film magnetic head element.

Reference is now made to FIG. 4 to describe an example of the configuration of a thin-film magnetic head element. FIG. 4 is a cross section of a thin-film magnetic head element orthogonal to the medium facing surface thereof. This example is of a composite thin-film magnetic head element wherein an induction-type electromagnetic transducer for writing and an MR element for reading are stacked.

A thin-film magnetic head element 71 of this example comprises: a substrate 72 made of a ceramic such as aluminum oxide and titanium carbide ($Al_2O_3$—TiC); an insulating layer 73 made of an insulating material such as alumina ($Al_2O_3$) and formed on the substrate 72; a bottom shield layer 74 made of a magnetic material and formed on the insulating layer 73; a bottom shield gap film 75 made of an insulating material such as alumina and formed on the bottom shield layer 74; and an MR element 76 for reading formed on the bottom shield gap film 75 such that an end of the MR element 76 is located in the medium facing surface (the surface on the left side of FIG. 4). The head element 71 further comprises: a pair of electrode layers 77 formed on the bottom shield gap film 75 and electrically connected to the MR element 76; a top shield gap film 78 covering the bottom shield gap film 75, the MR element 76 and the electrode layers 77; and a top-shield-layer-cum-bottom-pole layer (hereinafter called a bottom pole layer) 79 made of a magnetic material and formed on the top shield gap film 78. The MR element 76 may be an element utilizing a magneto-sensitive film that exhibits magnetoresistivity, such as an anisotropic magnetoresistive (AMR) element, a giant magnetoresistive (GMR) element or a tunnel magnetoresistive (TMR) element.

The head element 71 further comprises: a recording gap layer 80 made of an insulating material such as alumina and formed on the bottom pole layer 79; a thin-film coil 82 formed on the gap layer 80 and surrounded by an insulating layer 81 made of a thermoset photoresist, for example; a top pole layer 83 made of a magnetic material and formed on the insulating layer 81; and a protection layer 84 made of an insulating material such as alumina and covering the top pole layer 83. Although not shown, a plurality of pad-shaped electrodes are formed on the top surface of the protection layer 84, the electrodes being connected to the MR element 76 and the coil 82.

The top pole layer 83 includes a pole portion that is a portion located on a side of the medium facing surface. The bottom pole layer 79 includes a pole portion that is a portion located on a side of the medium facing surface. These pole portions face each other, the recording gap layer 80 being located in between. The pole portion of the top pole layer 83 has a width equal to the recording track width. The top pole layer 83 has an end located farther from the medium facing surface, this end being connected and magnetically coupled to the bottom pole layer 79 through a contact hole formed in the recording gap layer 80.

The medium facing surface (the surface located on the left side of FIG. 4) of the magnetic head element 71 shown in FIG. 4 is the surface to be lapped by the processing apparatus 1 shown in FIG. 3. While lapping, the processing apparatus 1 performs control such that throat height TH and MR height MR-h of every magnetic head element 71 included in the bar 70 fall within a certain limited tolerance. Such control may be performed through observing the resistance values of an electrical lapping guide (ELG) and the MR element 76 as disclosed in Published Unexamined Japanese Patent Application Heisei 2-95572 (1990), for example. The electrical lapping guides are, for example, formed on the substrate 72 when the magnetic head element 71 is formed, the lapping guides being placed at both ends of the length of the bar 70.

Figure 5:
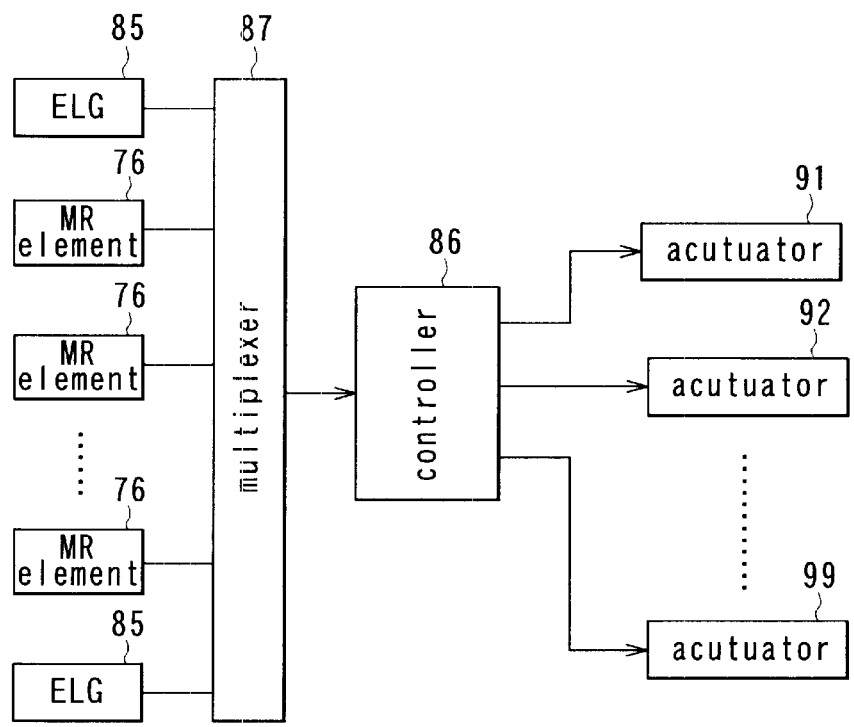
FIG. 5 is a block diagram showing an example of circuit configuration of the processing apparatus.

FIG. 5 is a block diagram showing an example of circuit configuration in a processing apparatus for controlling lapping by observing the resistance values of electrical lapping guides and MR elements as described above. The processing apparatus of this example comprises a controller 86 for controlling nine actuators 91 to 99 for applying loads in the three directions to the load application sections 54A, 54B and 54C of the jig 50 through observing the resistance values of electrical lapping guides (ELG) 85 and the MR elements 76 in the bar 70; and a multiplexer 87, connected to the plurality of electrical lapping guides 85 and the MR elements 76 in the bar 70 through a connector not shown, for selectively connecting one of the electrical lapping guides 85 and one of the MR elements 76 to the controller 86.

In the processing apparatus, the controller 86 controls the actuators 91 to 99 through the multiplexer 87 by observing the resistance values of the electrical lapping guides 85 and the MR elements 76 in the bar 70. The controller 86 first performs coarse control by observing the resistance of the electrical lapping guides 85. The controller 86 then performs control by observing the resistance of the MR elements 76 so that throat height TH and MR height MR-h of every magnetic head element 71 fall within a certain limited tolerance.

Reference is now made to FIG. 6 to FIG. 10 to describe an example of the method of cutting the bar 70 out of a wafer. The bar 70 is to be processed through the use of the jig 50 of this embodiment of the invention. In the following example the wafer utilized is circular-plate-shaped and includes a plurality of rows of slider sections each of which includes a thin-film magnetic head element. A plurality of types of blocks having different widths are obtained from this wafer. Each of the blocks includes a plurality of rows of slider sections and has a specific width. The bars are obtained through cutting each of the blocks in one direction.

In the following example the diameter of the circular-plate-shaped wafer may be 76.2 mm (3 inches), 152.4 mm (6 inches), or 203.2 mm (8 inches), for example. In the following description the wafers each having a diameter of 76.2 mm (3 inches), 152.4 mm (6 inches), and 203.2 mm (8 inches) are called a 3-inch wafer, a 6-inch wafer, and an 8-inch wafer, respectively.

Figure 6:
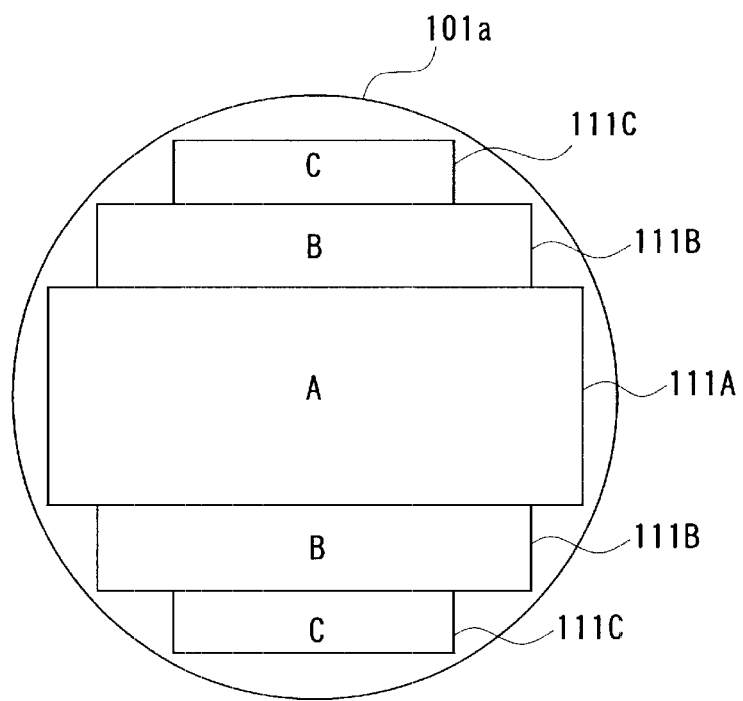
FIG. 6 is an explanatory view illustrating an example of arrangement of blocks for obtaining three types of blocks from a 3-inch wafer.

FIG. 6 is an explanatory view illustrating an example of arrangement of blocks for obtaining three types of blocks from a 3-inch wafer. In this example the three types of blocks 111A, 111B and 111C are obtained from the 3-inch wafer 101a. In FIG. 6 to FIG. 10 the blocks 111A, 111B and 111C are also indicated with A, B and C, respectively, for convenience. In FIG. 6 the rows of slider sections are horizontally arranged and each of the rows is located on top or at the bottom of the adjacent one of the rows. The width of each of the blocks 111A, 111B and 111C is the horizontal length of each of the blocks 111A, 111B and 111C shown in FIG. 6. Among the blocks 111A, 111B and 111C, the block 111A is greatest in width and the block 111B is the second greatest. The block 111C is smallest.

In the example shown in FIG. 6, the block 111A is cut out from a portion located in the middle of the vertical length of the 3-inch wafer 101a. The blocks 111B are cut out from portions on top of and at the bottom of the block 111A, respectively. The blocks 111C are each cut out from a portion on top of the upper one of the blocks 111B and a portion at the bottom of the lower one of the blocks 111B, respectively. The region extending from the periphery of the wafer 101a toward the interior and having a specific width is excluded from the portions to be the blocks.

The width of the block 111A may be 69.6 mm±5% for example. The width of the blocks 111B may be 57.6 mm±5%, for example. The width of the blocks 111C may be 38.4 mm±5%, for example. Of each of the blocks 111A, 111B and 111C, slider sections located in a region having a specific width (about the width of two slider sections) from each of ends toward the middle across the width are rejected. The rest of the slider sections are utilized.

Figure 7:
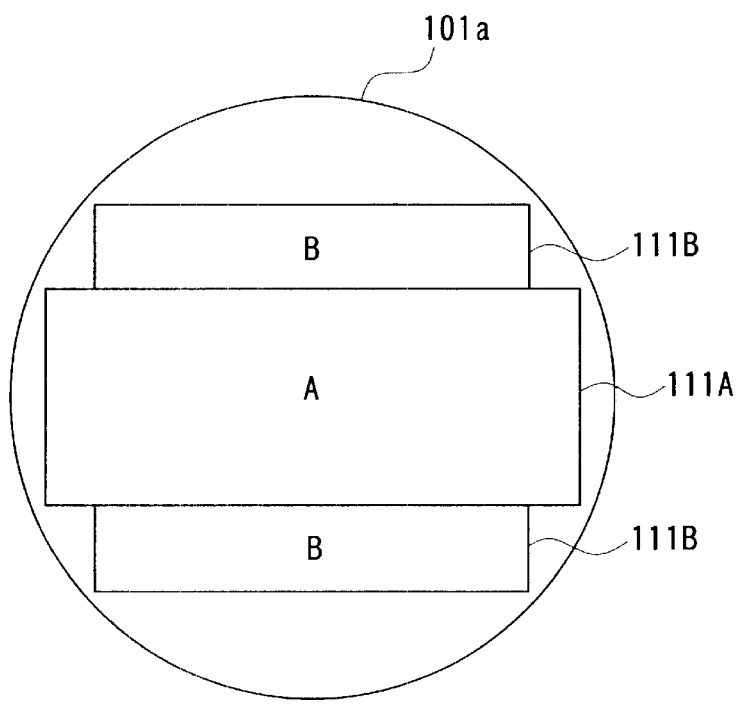
FIG. 7 is an explanatory view illustrating an example of arrangement of blocks for obtaining two types of blocks from a 3-inch wafer.

FIG. 7 is an explanatory view illustrating an example of arrangement of blocks for obtaining two types of blocks from a 3-inch wafer. In this example two types of blocks 111A and 111B are obtained from the 3-inch wafer 101a. The arrangement of the blocks 111A and 111B in the wafer 101a is similar to the example shown in FIG. 6.

Figure 8:
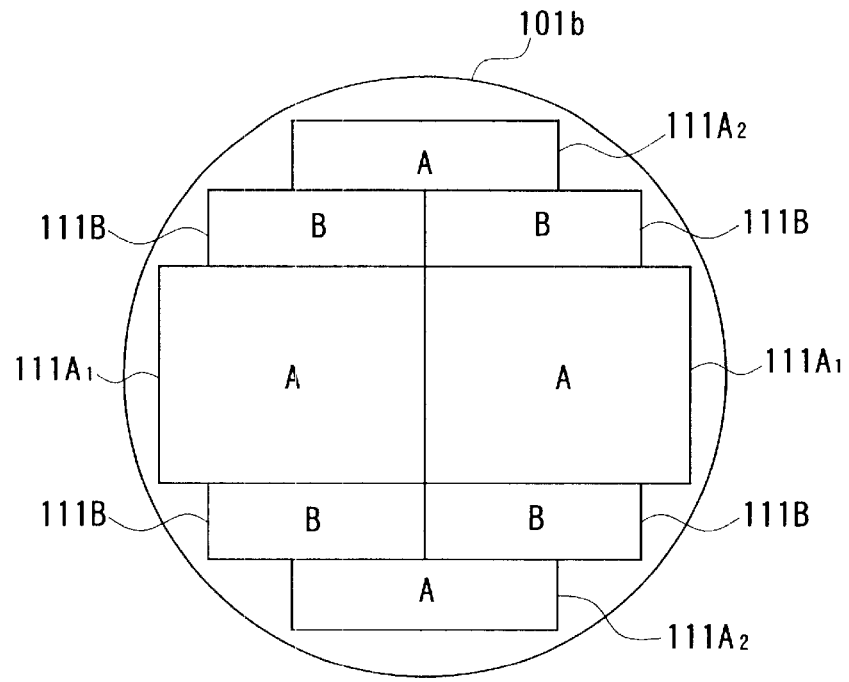
FIG. 8 is an explanatory view illustrating an example of arrangement of blocks for obtaining two types of blocks from a 6-inch wafer.

FIG. 8 is an explanatory view illustrating an example of arrangement of blocks for obtaining two types of blocks from a 6-inch wafer. In the example shown in FIG. 8, two blocks 111A, placed side by side are cut out from a portion located in the middle of the vertical length of the 6-inch wafer 101b. The blocks 111B are cut out from portions on top of and at the bottom of each of the blocks $111A_1$. Blocks $111A_2$ are each cut out from a portion on top of upper ones of the blocks 111B and a portion at the bottom of lower ones of the blocks 111B. The blocks $111A_1$ and $111A_2$ belong to the same type as the block 111A and are the same as the block 111A in width.

Figure 9:
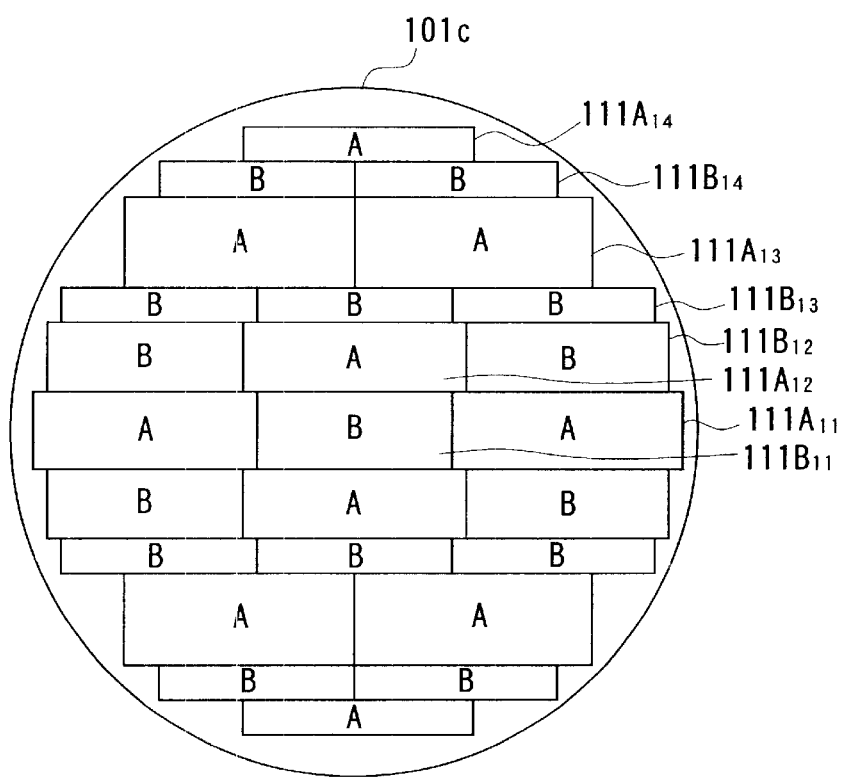
FIG. 9 is an explanatory view illustrating an example of arrangement of blocks for obtaining two types of blocks from an 8-inch wafer.

FIG. 9 is an explanatory view illustrating an example of arrangement of blocks for obtaining two types of blocks from an 8-inch wafer. In the example shown in FIG. 9, in a portion located in the middle of the vertical length of the 8-inch wafer 101c, a block $111B_{11}$ is cut out from a portion located in the middle of the horizontal length of the wafer 101c. Blocks $111A_{11}$ are cut out from portions on sides of the block $111B_{11}$. Blocks $111A_{12}$ are cut out from portions on top of and at the bottom of the blocks $111A_{11}$ and $111B_{11}$, the portions being located in the middle of the horizontal length. Blocks $111B_{12}$ are cut out from portions on sides of the blocks $111A_{12}$. Three blocks $111B_{13}$ placed side by side are cut out from a portion on top of the upper ones of the blocks $111A_{12}$ and $111B_{12}$. Another three blocks $111B_{13}$ placed side by side are cut out from a portion at the bottom of the lower ones of the blocks $111A_{12}$ and $111B_{12}$. Two blocks $111A_{13}$ placed side by side are cut out from a portion on top of the upper ones of the blocks $111B_{13}$. Another two blocks $111A_{13}$ placed side by side are cut out from a portion at the bottom of the lower ones of the blocks $111B_{13}$. Two blocks $111B_{14}$ placed side by side are cut out from a portion on top of the upper ones of the blocks $111A_{13}$. Another two blocks $111B_{14}$ placed side by side are cut out from a portion at the bottom of the lower ones of the blocks $111A_{13}$. Blocks $111A_{14}$ are each cut out from a portion on top of the upper ones of the blocks $111B_{14}$ and a portion at the bottom of the lower ones of the blocks $11B_{14}$.

The blocks $111A_{11}$, $111A_{12}$, $111A_{13}$ and $111A_{14}$ belong to the same type as the block 111A and are the same as the block 111A in width. Similarly, the blocks $111B_{11}$, $111B_{12}$, $111B_{13}$ and $111B_{14}$ belong to the same type as the block 111B and are the same as the block 111B in width.

Figure 10:
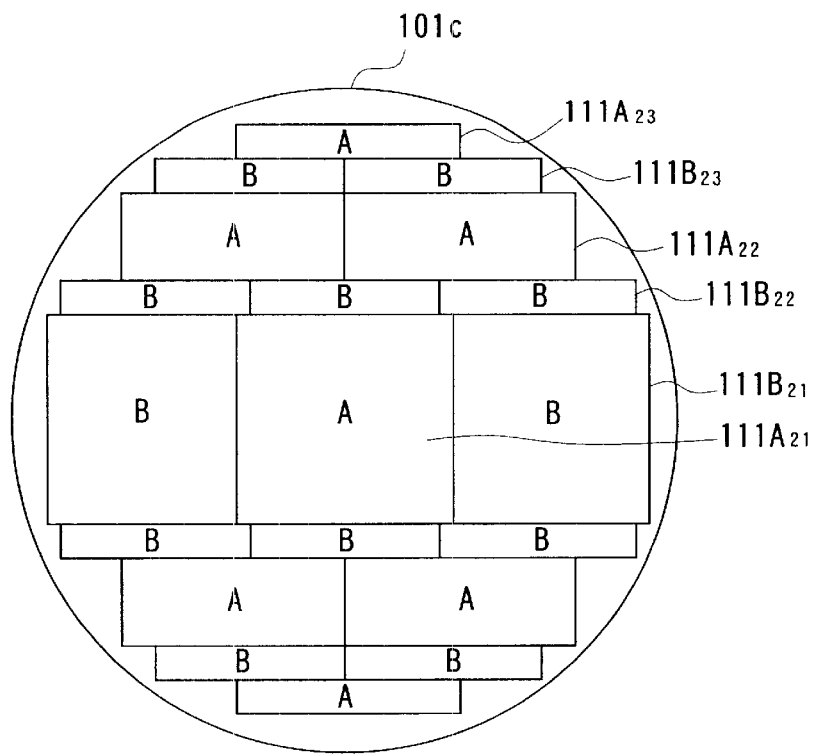
FIG. 10 is an explanatory view illustrating another example of arrangement of blocks for obtaining two types of blocks from an 8-inch wafer.

FIG. 10 is an explanatory view illustrating an example of arrangement of blocks for obtaining two types of blocks from an 8-inch wafer. In the example shown in FIG. 10, in a portion located in the middle of the vertical length of the 8-inch wafer 101c, a block $111A_{21}$ is cut out from a portion of the wafer 101c located in the middle of the horizontal length. Blocks $111B_{21}$ are cut out from portions on sides of the block $111A_{21}$. Three blocks $111B_{22}$ placed side by side are cut out from a portion on top of the blocks $111A_{21}$ and $111B_{21}$. Another three blocks $111B_{22}$ placed side by side are cut out from a portion at the bottom of the blocks $111A_{21}$ and $111B_{21}$. Two blocks $111A_{22}$ placed side by side are cut out from a portion on top of the upper ones of the blocks $111B_{22}$. Another two blocks $111A_{22}$ placed side by side are cut out from a portion at the bottom of the lower ones of the blocks $111B_{22}$. Two blocks $111B_{23}$ placed side by side are cut out from a portion on top of the upper ones of the blocks $111A_{22}$. Another two blocks $111B_{23}$ placed side by side are cut out from a portion at the bottom of the lower ones of the blocks $111A_{22}$. Blocks $111A_{23}$ are each cut out from a portion on top of the upper ones of the blocks $111B_{23}$ and a portion at the bottom of the lower ones of the blocks $111B_{23}$.

The blocks $111A_{21}$, $111A_{22}$ and $111A_{23}$ belong to the same type as the block 111A and are the same as the block 111A in width. Similarly, the blocks $111B_{21}$, $111B_{22}$ and $111B_{23}$ belong to the same type as the block 111B and are the same as the block 111B in width.

The two or three types of blocks are thus obtained from the wafer as in the examples shown in FIG. 6 to FIG. 10. These blocks are then separated into bars. As a result, two types of bars having a length of 69.6 mm±5% and a length of 57.6 mm±5% are obtained. Alternatively, three types of bars including a bar having a length of 38.4 mm±5%, in addition to the two types, are obtained. The jig 50 of the embodiment of the invention is commonly used for these types of bars.

Referring to the results of structural analysis simulations, the function and effects of the jig 50 of the embodiment will now be described in detail.

Figure 11:
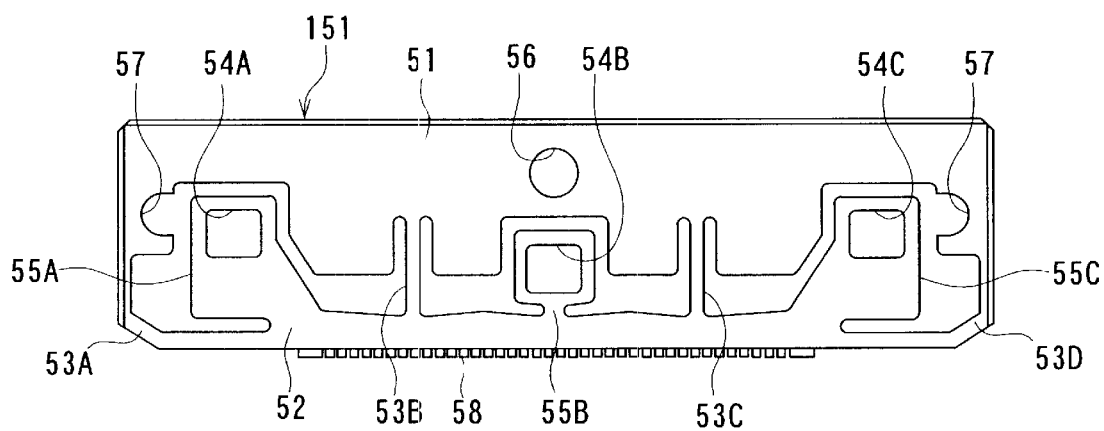
FIG. 11 is a front view of a jig of a first reference example to be compared with the jig of the first embodiment of the invention.
Figure 12:
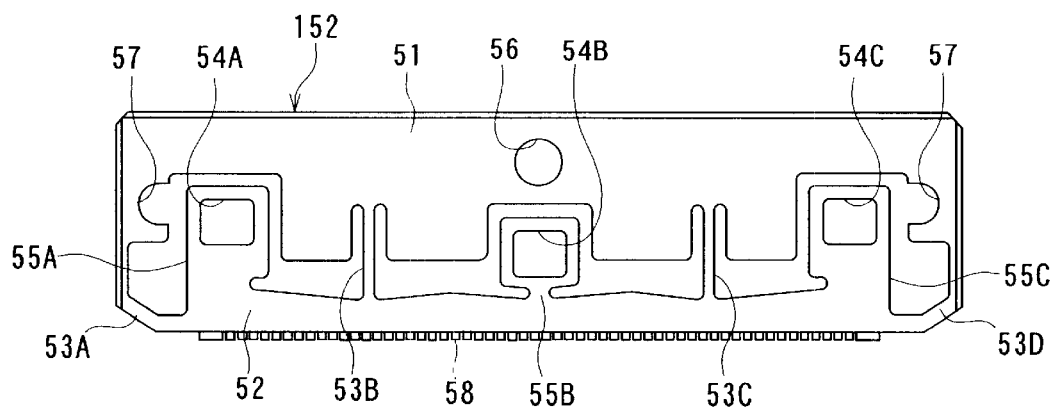
FIG. 12 is a front view of a jig of a second reference example to be compared with the jig of the first embodiment of the invention.

The following is a description of two jigs of reference examples compared with the jig 50 of the embodiment in the simulations. FIG. 11 is a front view of the jig 151 of the first reference example. FIG. 12 is a front view of the jig 152 of the second reference example.

In the jig 151 of the first reference example shown in FIG. 11, ends of the retainer 52 are coupled to the main body 51 through the couplers 53A and 53D. The retainer 52 and the bar fixing section 58 of the jig 151 are designed so as to be suitable for a bar having a length of about 50 mm, and shorter than the retainer 52 and the fixing section 58 of the jig 50 of the embodiment of the invention. While the retainer 52 is shorter, the couplers 53A and 53D of the jig 151 are longer.

The retainer 52 and the bar fixing section 58 of the jig 152 of the second reference example shown in FIG. 12 are designed so as to be suitable for a bar having a length of about 70 mm, and longer than the retainer 52 and the fixing section 58 of the jig 151 of the first reference example, and similar in length to the retainer 52 and the fixing section 58 of the jig 50 of the embodiment. In the jig 152, too, the ends of the retainer 52 are coupled to the main body 51 through the couplers 53A and 53D. While the retainer 52 of the jig 152 is longer than that of the jig 151 of the first reference example, the couplers 53A and 53D of the jig 152 are shorter.

Figure 13:
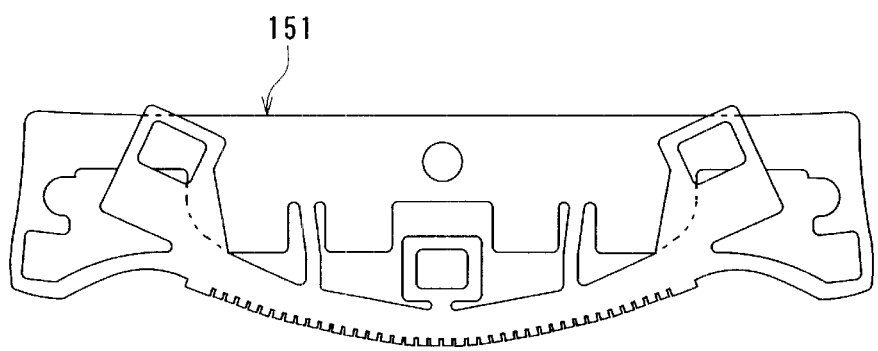
FIG. 13 illustrates the result of structural analysis simulation of the jig of the first reference example.

FIG. 13 illustrates the result of structural analysis simulation of the jig 151 of the first reference example shown in FIG. 11. In this simulation a load of 9.8 N (=1 kgf) is applied to each of the load application sections 54A and 54C in the upper direction, and a load of 9.8 N (=1 kgf) is applied to the load application section 54B in the lower direction. According to the result of the simulation, a nearly ideal flection of the retainer 52 is obtained. This is because the couplers 53A and 53D are long enough but free deformation of portions of the retainer 52 near the ends thereof is not suppressed.

Figure 14:
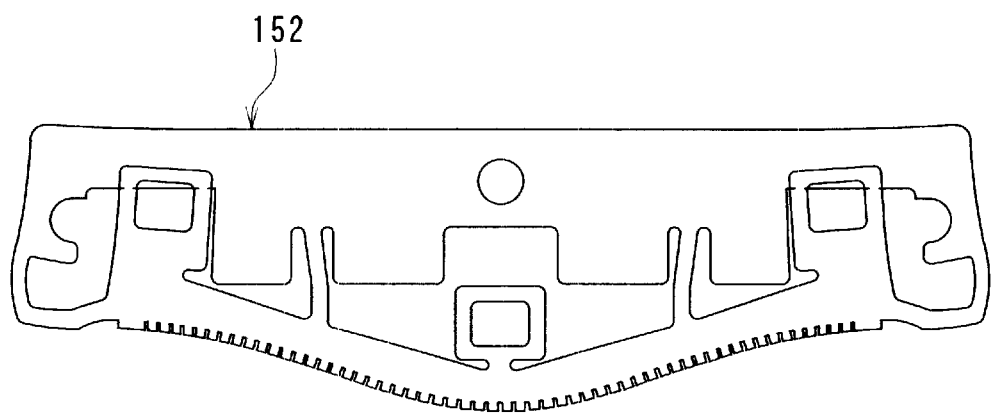
FIG. 14 illustrates the result of structural analysis simulation of the jig of the second reference example.

FIG. 14 illustrates the result of structural analysis simulation of the jig 152 of the second reference example shown in FIG. 12. The condition of load application is similar to that of the case described with reference to FIG. 13. According to the result of the simulation, free deformation of portions of the retainer 52 near the ends thereof is suppressed. In the structure in which the ends of the retainer 52 are coupled to the main body 51 through the couplers 53A and 53D as this example, if the retainer 52 is made longer, the couplers 53A and 53D are thereby made shorter. Consequently, free deformation of portions of the retainer 52 near the ends thereof is suppressed, and it is impossible to obtain ideal flections of the portions of the retainer 52 near the ends of the retainer 52.

According to the simulation, with regard to the structure in which the ends of the retainer 52 are coupled to the main body 51 through the couplers 53A and 53D as the first or second reference example, a nearly ideal flection of the retainer 52 is obtained if the length of the retainer 52 is smaller than or equal to about 65 percent of the length of the main body 51. If the length of the retainer 52 is greater than about 65 percent of the length of the main body 51, it is impossible to obtain ideal flections of the portions of the retainer 52 near the ends of the retainer 52.

Figure 15:
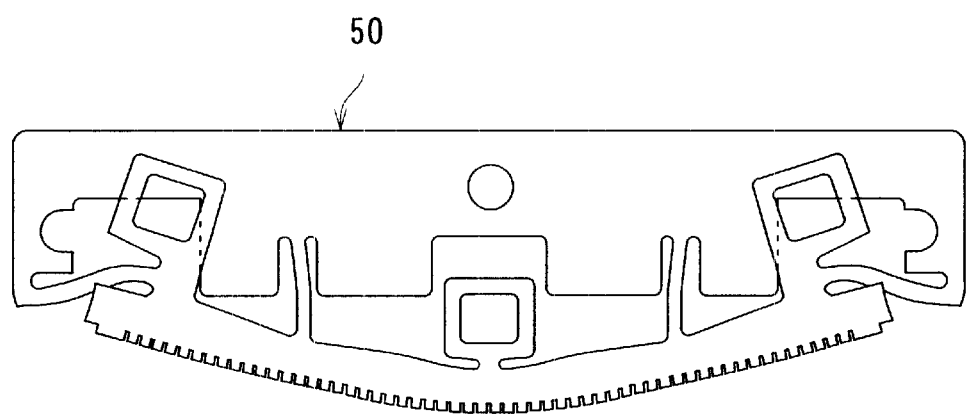
FIG. 15 illustrates the result of structural analysis simulation of the jig of the first embodiment of the invention.

FIG. 15 illustrates the result of structural analysis simulation of the jig 50 of the embodiment of the invention shown in FIG. 1A, FIG. 1B, FIG. 1C and FIG. 1D. The condition of load application is similar to that of the case described with reference to FIG. 13. According to the result of the simulation, an ideal flection of the retainer 52 is obtained. In the structure in which the ends 52a and 52b of the retainer 52 are not coupled to the main body 51 but left open as this jig 50, it is possible to obtain an ideal flection of the retainer 52 even if the retainer 52 is made longer. According to the simulation, if the length of the retainer 52 is smaller than or equal to about 85 percent of the length of the main body 51, a nearly ideal flection of the retainer 52 is obtained.

Reference is now made to FIG. 16 to FIG. 25 to describe the results of two simulations that quantitatively indicate that the jig 50 of the embodiment allows a more ideal flection of the retainer 52 than the jig 152 of the second reference example shown in FIG. 12.

Figure 16:
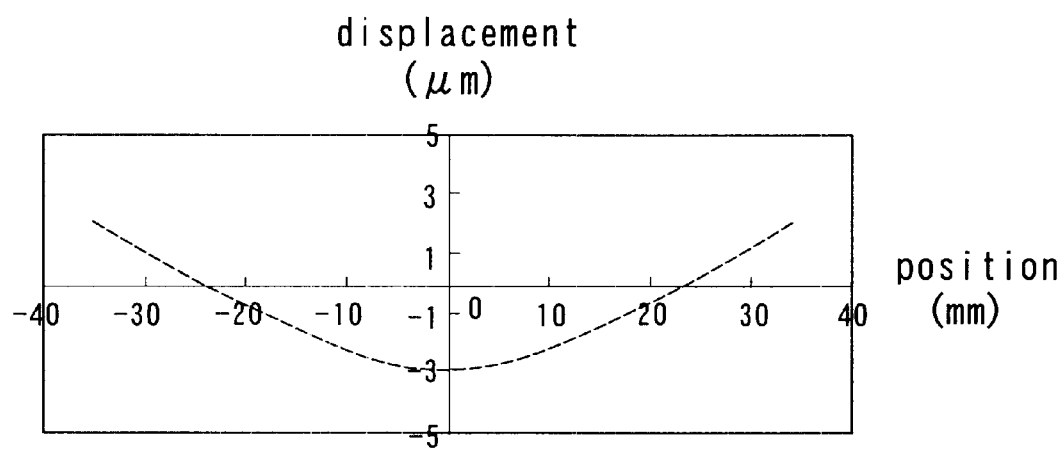
FIG. 16 illustrates the displacement curve of the retainer expected to be obtained in a first simulation.

FIG. 16 to FIG. 20 relates to the first simulation. FIG. 16 illustrates the displacement curve (hereinafter called the ideal curve) of the retainer 52 expected to be obtained in the first simulation. In FIG. 16 the horizontal axis indicates the position in the retainer 52 along the length. The vertical axis indicates displacements of the retainer in the vertical direction.

Figure 17:
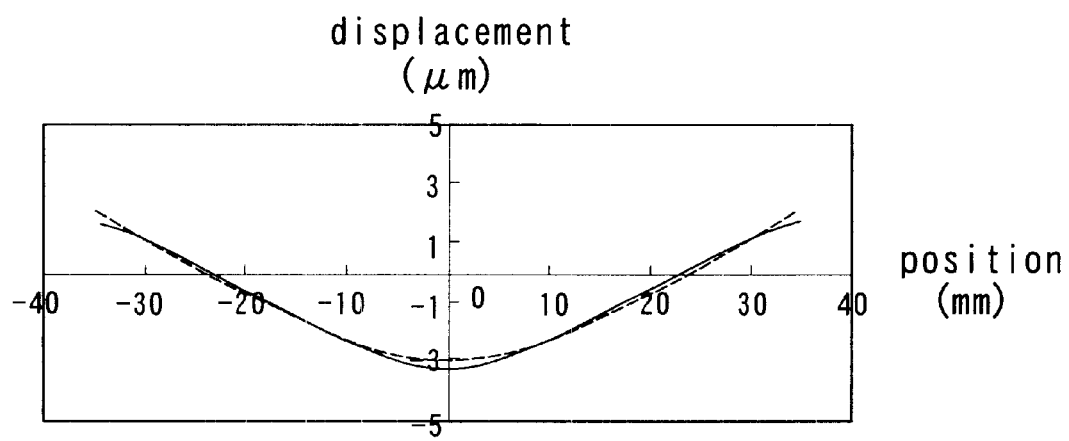
FIG. 17 illustrates the displacement curve of the retainer obtained in the jig of the second reference example in the first simulation.
Figure 18:
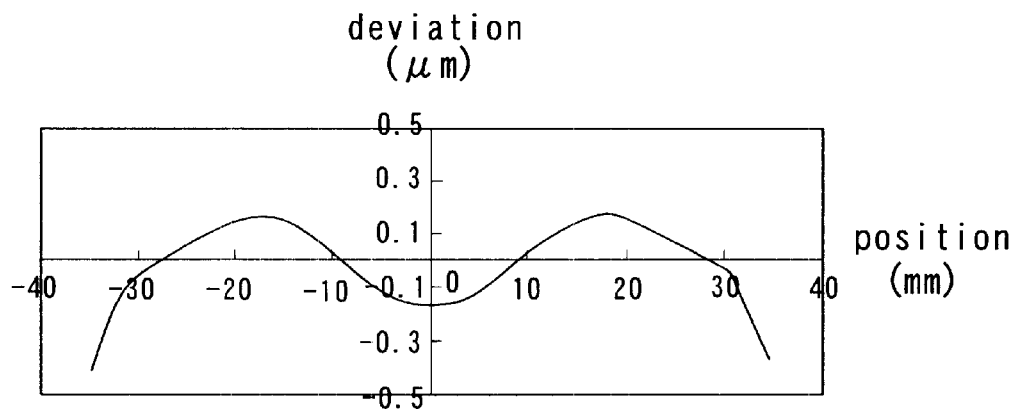
FIG. 18 illustrates the deviation of the displacement curve of the retainer obtained in the jig of the second reference example in the first simulation from the ideal curve.

FIG. 17 illustrates the displacement curve of the retainer 52 obtained in the jig 152 of the second reference example, wherein the ideal curve is indicated with a broken line. The vertical and horizontal axes of FIG. 17 are similar to those of FIG. 16. FIG. 18 illustrates the deviation of the displacement curve of the retainer 52 obtained in the jig 152 of the second reference example shown in FIG. 17 from the ideal curve. In FIG. 18 the horizontal axis indicates the position in the retainer 52 along the length. The vertical axis indicates deviations.

Figure 19:
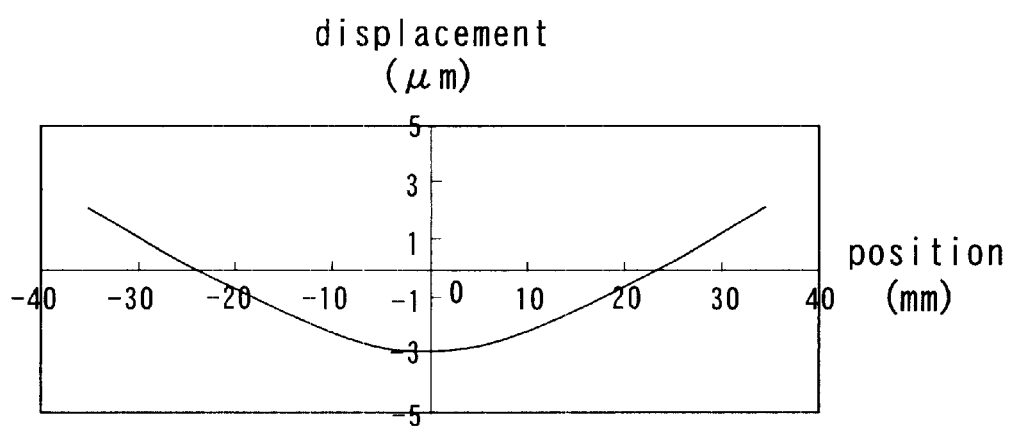
FIG. 19 illustrates the displacement curve of the retainer obtained in the jig of the first embodiment of the invention in the first simulation.
Figure 20:
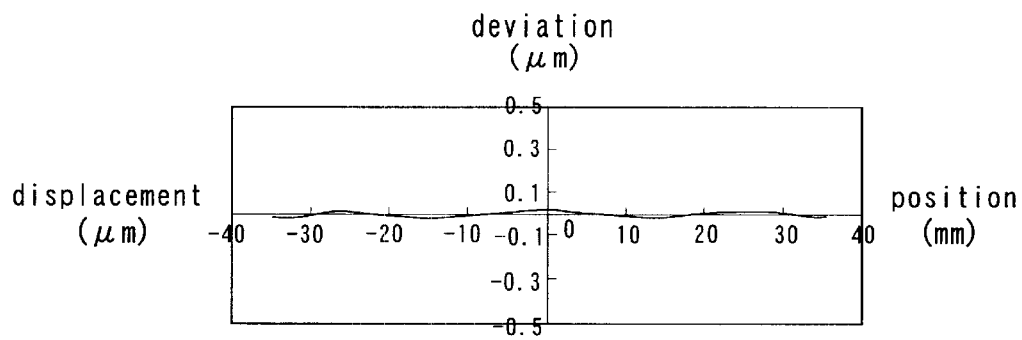
FIG. 20 illustrates the deviation of the displacement curve of the retainer obtained in the jig of the first embodiment in the first simulation from the ideal curve.

FIG. 19 illustrates the displacement curve of the retainer 52 obtained in the jig 50 of the embodiment. The vertical and horizontal axes of FIG. 19 are similar to those of FIG. 16. FIG. 20 illustrates the deviation of the displacement curve of the retainer 52 obtained in the jig 50 of the embodiment from the ideal curve shown in FIG. 16. The vertical and horizontal axes of FIG. 20 are similar to those of FIG. 18.

FIG. 18 and FIG. 20 being compared, it is noted that the jig 50 of the embodiment allows a more ideal flection of the retainer 52 than the jig 152 of the second reference example.

Figure 21:
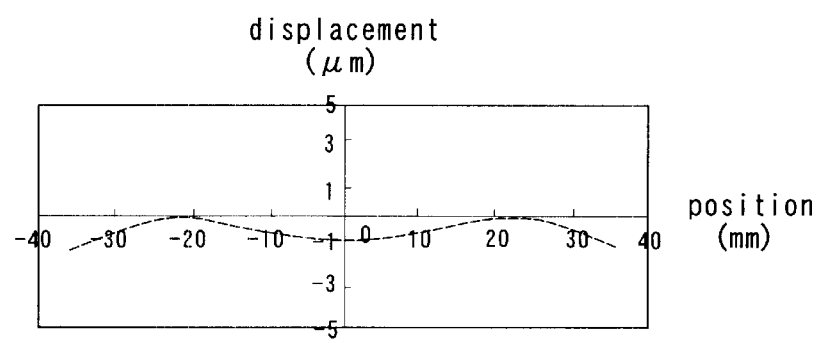
FIG. 21 illustrates the displacement curve of the retainer expected to be obtained in a second simulation.

FIG. 21 to FIG. 25 relates to the second simulation. FIG. 21 illustrates the displacement curve (the ideal curve) of the retainer 52 expected to be obtained in the second simulation. In FIG. 21 the horizontal axis indicates the position in the retainer 52 along the length. The vertical axis indicates displacements of the retainer 52 in the vertical direction.

Figure 22:
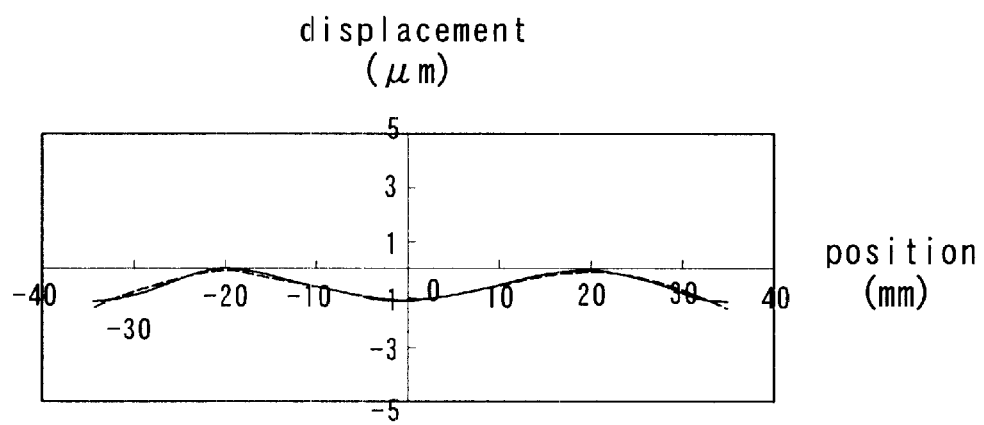
FIG. 22 illustrates the displacement curve of the retainer obtained in the jig of the second reference example in the second simulation.
Figure 23:
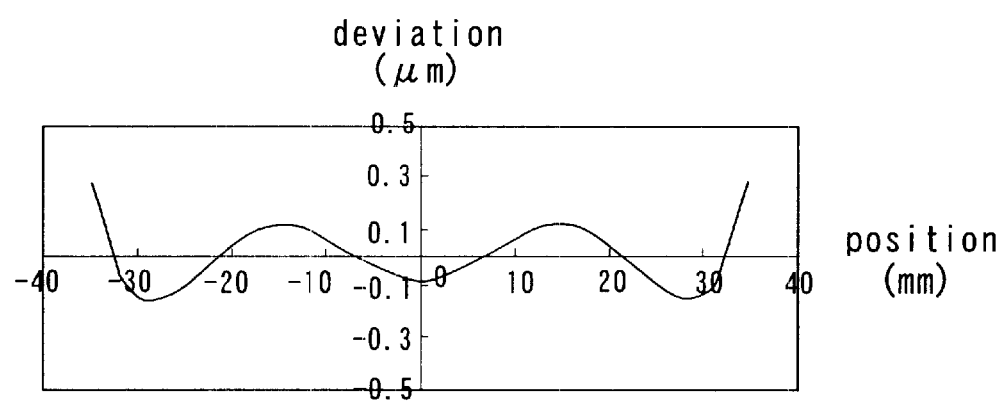
FIG. 23 illustrates the deviation of the displacement curve of the retainer obtained in the jig of the second reference example in the second simulation from the ideal curve.

FIG. 22 illustrates the displacement curve of the retainer 52 obtained in the jig 152 of the second reference example indicated with a solid line and the ideal curve indicated with a broken line. The vertical and horizontal axes of FIG. 22 are similar to those of FIG. 21. FIG. 23 illustrates the deviation of the displacement curve of the retainer 52 obtained in the jig 152 of the second reference example shown in FIG. 22 from the ideal curve. In FIG. 23 the horizontal axis indicates the position in the retainer 52 along the length. The vertical axis indicates deviations.

Figure 24:
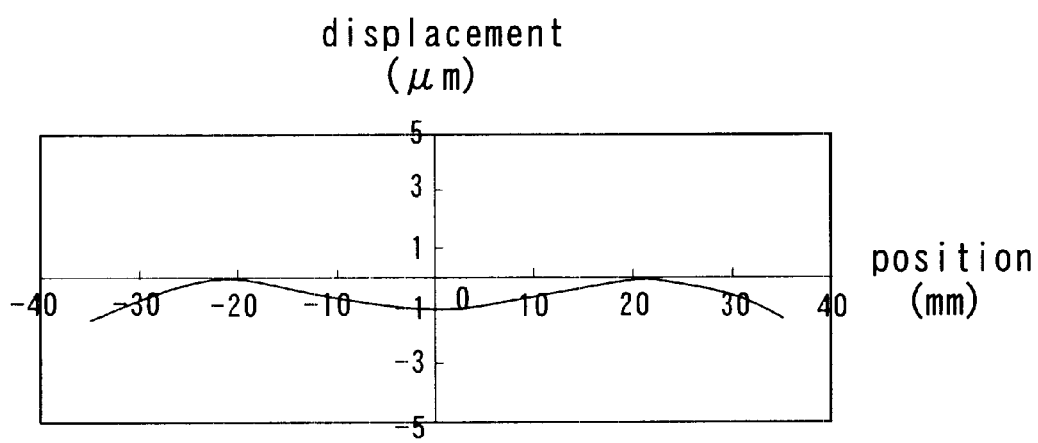
FIG. 24 illustrates the displacement curve of the retainer obtained in the jig of the first embodiment of the invention in the second simulation.
Figure 25:
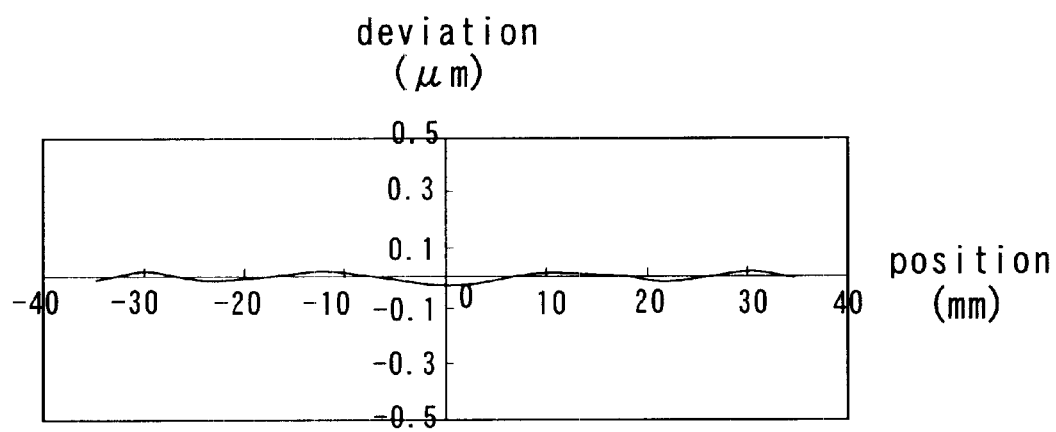
FIG. 25 illustrates the deviation of the displacement curve of the retainer obtained in the jig of the first embodiment in the second simulation from the ideal curve.

FIG. 24 illustrates the displacement curve of the retainer 52 obtained in the jig 50 of the embodiment. The vertical and horizontal axes of FIG. 24 are similar to those of FIG. 21. FIG. 25 illustrates the deviation of the displacement curve of the retainer 52 obtained in the jig 50 of the embodiment shown in FIG. 24 from the ideal curve shown in FIG. 21. The vertical and horizontal axes of FIG. 25 are similar to those of FIG. 23.

FIG. 23 and FIG. 25 being compared, it is noted that the jig 50 of the embodiment allows a more ideal flection of the retainer 52 than the jig 152 of the second reference example.

According to the jig 50 of the embodiment thus described, the ends 52a and 52b of the retainer 52 are not coupled to the main body 51 but left open. As a result, free deformation of portions near the ends 52a and 52b of the retainer 52 will not be prevented. Therefore, the jig 50 allows the retainer 52 including the portions near the ends 52a and 52b to be deformed into a desired shape. As a result, it is possible to process the bar 70 with accuracy even if the bar 70 is long, and to reduce deviations from the target values of the throat height and the MR height of each of many of thin-film magnetic head elements included in the long bar 70. It is thereby possible to improve the yield of thin-film magnetic heads.

[Second Embodiment]

Figure 26:
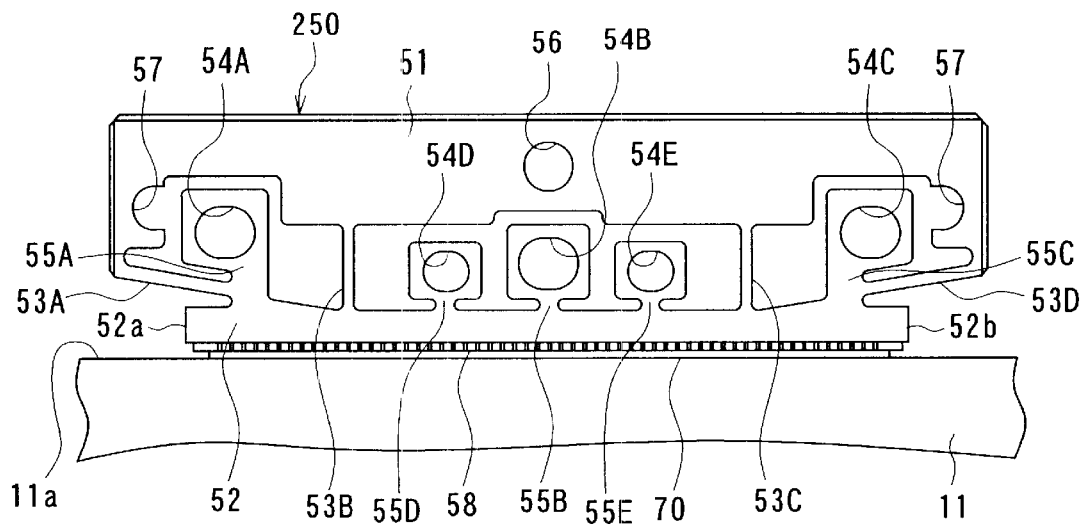
FIG. 26 is a front view of a jig of a second embodiment of the invention in use.

Reference is now made to FIG. 26 to describe a processing jig of a second embodiment of the invention. FIG. 26 is a front view of the jig 250 of the second embodiment in use. In the jig 250 a load application section 54D and an arm 55D are provided between the load application section 54B and the coupler 53B. The arm 55D couples the load application section 54D to the retainer 52. A load application section 54E and an arm 55E are provided between the load application section 54B and the coupler 53C. The arm 55E couples the load application section 54E to the retainer 52. In the jig 250 each of the load application sections 54A to 54E is nearly-circular-hole-shaped in cross section. These load application sections 54A to 54E are driven in the vertical direction. The processing apparatus in which this jig 250 is utilized incorporates five load application rods capable of applying individual loads to the five load application sections 54A to 54E.

According to the second embodiment, although the load application sections 54A to 54E are displaced only in the vertical direction, the number of the load application sections is greater than that of the jig 50 of the first embodiment. As a result, it is possible to deform the retainer 52 into a complicated shape as in the first embodiment, and to control the throat heights and MR heights of the thin-film magnetic head elements with high accuracy.

The remainder of configuration, functions and effects of the second embodiment are similar to those of the first embodiment.

[Third Embodiment]

Figure 27:
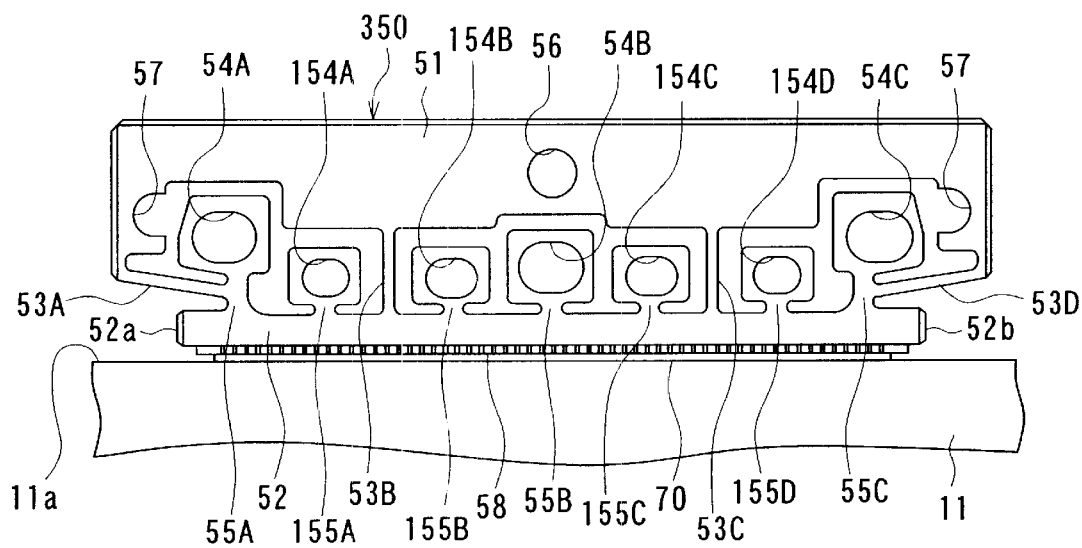
FIG. 27 is a front view of a jig of a third embodiment of the invention in use.

Reference is now made to FIG. 27 to describe a processing jig of a third embodiment of the invention. FIG. 27 is a front view of the jig 350 of the third embodiment in use. In the jig 350 a load application section 154A and an arm 155A are provided between the load application section 54A and the coupler 53B. The arm 155A couples the load application section 154A to the retainer 52. A load application section 154B and an arm 155B are provided between the load application section 54B and the coupler 53B. The arm 155B couples the load application section 154B to the retainer 52. A load application section 154C and an arm 155C are provided between the load application section 54B and the coupler 53C. The arm 155C couples the load application section 154C to the retainer 52. A load application section 154D and an arm 155D are provided between the load application section 54B and the coupler 53D. The arm 155D couples the load application section 154D to the retainer 52. In the jig 350 each of the load application sections 54A to 54C and 154A to 154D is nearly-circular-hole-shaped in cross section. These load application sections 54A to 54C and 154A to 154D are driven in the vertical direction. The processing apparatus in which this jig 350 is utilized incorporates seven load application rods capable of applying individual loads to the seven load application sections 54A to 54C and 154A to 154D.

According to the third embodiment, the number of the load application sections is greater than that of the jig 250 of the second embodiment. As a result, the jig 350 allows the retainer 52 to be deformed into a more complicated shape, compared to the jig 250 of the second embodiment. It is thereby possible to control the throat heights and MR heights of the thin-film magnetic head elements with higher accuracy.

The remainder of configuration, functions and effects of the third embodiment are similar to those of the first or second embodiment.

The present invention is not limited to the foregoing embodiments but may be practiced in still other ways. For example, the invention may be applied to any other processing such as polishing and grinding besides lapping. The invention may be applied to processing of any object other than thin-film magnetic heads.

According to the processing jig of the invention thus described, both ends of the retainer are not coupled to the main body but left open. As a result, it is possible to deform the retainer including portions near the ends thereof into a desired shape, and to process the object with accuracy even if it is long.

Obviously many modifications and variations of the present invention are possible in the light of the above teachings. It is therefore to be understood that within the scope of the appended claims the invention may be practiced otherwise than as specifically described.

What is claimed is:

1. A processing jig for retaining an object to be processed that is long in one direction, the jig being fixed to a processing apparatus for processing the object, the jig comprising:

a main body to be fixed to the processing apparatus;

a retainer that is long in one direction for retaining the object;

first and second couplers for coupling the retainer and the main body to each other; and first to third load application sections to each of which a load is applied for deforming the retainer, the load application sections being coupled to the retainer; wherein the first coupler is located closer to one of ends of the retainer than a middle of the length of the retainer, the second coupler is located closer to the other one of the ends of the retainer than the middle of the length of the retainer, the first load application section is located between the first and second couplers, the second load application section is located closer to the one of the ends of the retainer than the first coupler, the third load application section is located closer to the other one of the ends of the retainer than the second coupler, and each of the ends of the retainer is not coupled to the main body but left open.

2. The processing jig according to claim 1 wherein:

each of the second and third load application sections is coupled to a position closer to the middle by a specific distance from each of the ends of the retainer, the processing jig further comprising:

a third coupler having an end connected to the main body and the other end connected to a portion coupling the second load application section to the retainer; and a fourth coupler having an end connected to the main body and the other end connected to a portion coupling the third load application section to the retainer.

3. The processing jig according to claim 2 wherein each of the third and fourth couplers is plate-shaped and flexible.

4. The processing jig according to claim 1 wherein the object is a bar-like magnetic head material made up of a row of sections to be sliders each of which includes a thin-film magnetic head element.

5. The processing jig according to claim 2 wherein the object is a bar-like magnetic head material made up of a row of sections to be sliders each of which includes a thin-film magnetic head element.

6. The processing jig according to claim 3 wherein the object is a bar-like magnetic head material made up of a row of sections to be sliders each of which includes a thin-film magnetic head element.

* * * * *